United States Patent [19]

Hale et al.

[11] Patent Number: 5,317,394
[45] Date of Patent: May 31, 1994

[54] DISTRIBUTED APERTURE IMAGING AND TRACKING SYSTEM

[75] Inventors: Robert A. Hale, Ellicott City, Md.; Harvey C. Nathanson, Pittsburgh, Pa.; Joel F. Hazlett, Linthicum, Md.

[73] Assignee: Westinghouse Electric Corp., Pittsburgh, Pa.

[21] Appl. No.: 876,619

[22] Filed: Apr. 30, 1992

[51] Int. Cl.⁵ .................................................. H04N 7/18
[52] U.S. Cl. .................................... 348/208; 348/262; 348/147
[58] Field of Search .................. 358/87, 222, 109, 103, 358/108; H04N 7/18

[56] References Cited

U.S. PATENT DOCUMENTS

| | | | |
|---|---|---|---|
| 3,492,419 | 1/1970 | Bartonik | 358/87 |
| 3,619,500 | 11/1971 | Bouley | 358/222 |
| 4,103,435 | 8/1978 | Herndon | 358/87 |
| 4,152,724 | 5/1979 | Hunter | 358/87 |
| 4,340,878 | 7/1982 | Spooner | 358/103 |
| 4,672,435 | 6/1987 | Glück | 358/87 |
| 4,713,685 | 12/1987 | Nishimura | 358/108 |
| 4,742,390 | 5/1988 | Francke | 358/87 |
| 4,757,378 | 7/1988 | Hackett, Jr. | 358/87 |
| 4,772,942 | 9/1988 | Tuck | 358/87 |
| 4,876,597 | 10/1989 | Roy | 358/108 |
| 4,912,770 | 3/1990 | Seto | 358/109 |
| 4,916,536 | 4/1990 | Kerr | 358/87 |
| 4,959,725 | 9/1990 | Mandle | 358/222 |
| 4,992,866 | 2/1991 | Morgan | 358/108 |
| 5,023,719 | 6/1991 | Zwirn | 358/108 |
| 5,107,293 | 4/1992 | Sekine | 358/222 |
| 5,187,571 | 2/1993 | Braun | 358/87 |

FOREIGN PATENT DOCUMENTS

| | | | |
|---|---|---|---|
| 0336700 | 2/1991 | Japan | 358/108 |
| 2157526 | 10/1985 | United Kingdom | 358/108 |

Primary Examiner—Tommy P. Chin
Assistant Examiner—Bryan S. Tung
Attorney, Agent, or Firm—D. Schron

[57] ABSTRACT

An imaging system utilizes a plurality of sensors capable of sensing objects within a field of view about a sight line. At least two sensors have different sight lines with the sight lines having known relative positions. Each sensor produces signals corresponding to positions of objects within a field of view over time. At least one sensor signal memory receives those signals and stores them in a manner enabling concurrent access to signals received from any selected combination of sensors. The processing unit and associated memory contain at least one program for selecting sensor signals from a sensor signal memory. Preferably motion detectors are provided for determining vibration, flexure or movement of each sensor. A normalizing means is preferably provided to adjust the sensor or make an appropriate modification of the signal received from the sensor.

15 Claims, 3 Drawing Sheets

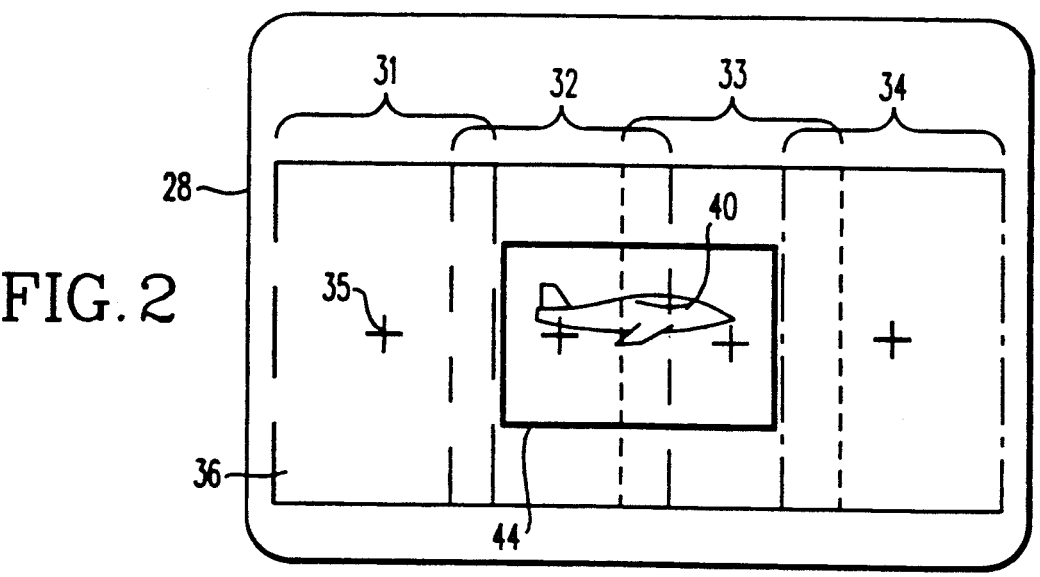
FIG. 2
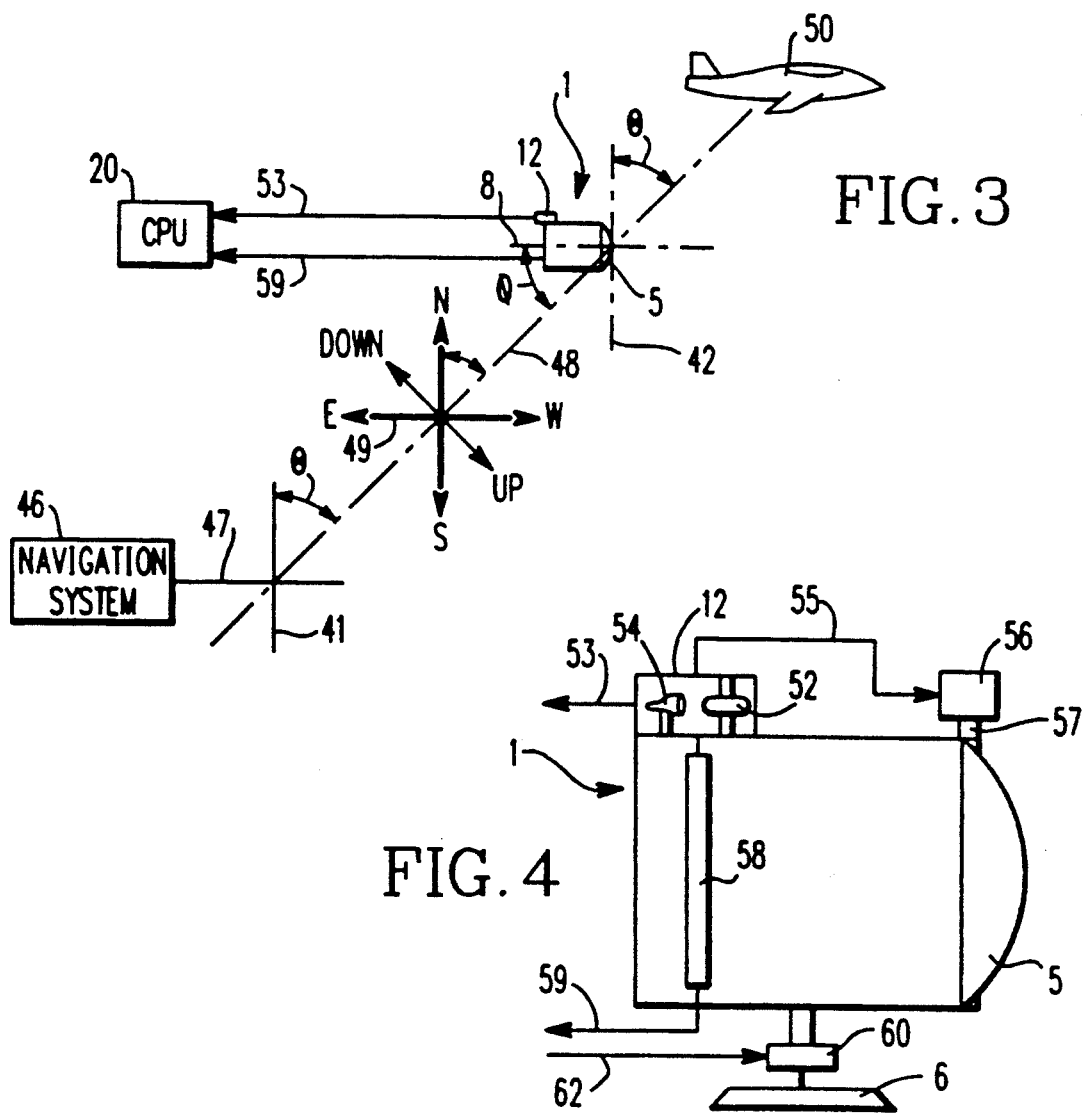
FIG. 3
FIG. 4

DISTRIBUTED APERTURE IMAGING AND TRACKING SYSTEM

BACKGROUND OF THE INVENTION

1. Field of the Invention

This invention relates to a system for creating images or tracking objects using a plurality of sensors.

2. Description of the Prior Art

Video images are frequently created to show a scene or record events occurring at a selected location over time. These images are frequently displayed on a video monitor wherein the image is comprised of a set of pixels. Each pixel has either an assigned grey level value or color. These images are created from signals emitted from sensors which are positioned to observe a scene. These sensors could be anything from video cameras to infrared detectors. Typically, the sensors produce analog signals corresponding to the scene which they observe. The analog signals are digitized to create digital images of the scene. Those digital images can be stored in a memory, displayed on a screen or directed to a variety of processing systems which may either extract information from the image or modify the image in accordance with predetermined procedures or reconstructed for display on a screen.

In many applications the sensor or optics associated with the sensor are moved to enable the sensor to survey across a desired field of regard. Such systems generate data in serial form as the sensor or the optics moves across the field of regard. The scan rate associated with such movement determines how rapidly an image can be created and can also affect the clarity of the image which is created. At the present time the data rate available from serially scanning systems is much lower than the ability of processors to handle the generated data. Hence, image processing capabilities have evolved which can process image data much faster than image data can be generated by the serially scanning systems.

When serial scanning is used, images are revisited and updated at a relatively low rate. These low update rates limit passive ranging performance as well as clutter discrimination. Serially scanned systems also have necessarily shorter detector dwell times which limit the sensitivity and detection range. The combined degradations in ranging, discrimination and detection can be severely limiting in tactical and surveillance applications.

Another problem associated with serial scanned systems is that they generally use gimballed optics and serial scan mechanisms which have moving parts that are costly and unreliable. Large protruding apertures are required to maximize coverage. For protection such apertures require spherical windows or greenhouse flat windows. Such spherical windows are generally not desired in aircraft because they make the aircraft easier to detect and also interrupt the aerodynamics of the airplane body. Gimballed optics are not generally compatible with conformal mounting if a large field of view is required. Costly assembly, alignment and maintenance is also characteristic of gimballed optics. Hence, there is a need for an image and tracking system which can cover a wide field of regard without using gimballed optics or other moving parts.

The art has suggested that serial gimballed sensor scanners be replaced with a large number of staring sensors fixed to a host platform. Staring focal plan arrays (FPA's) are distributed to obtain maximal coverage with minimal moving parts. Each array generates a series of signals corresponding to the field-of view which it observes. Those signals must normally be combined with signals from other arrays to generate a full field-of-regard. Since each array stares at its field-of-view, the processing time to create such images can be 1,000 times longer than is available with serial scan systems. Another problem with using parallel arrays is that platform motion can be crippling to long staring time sensors that are mounted on the platform. For example, a 100° per second motion would move scene data across 116 pixels if each sensor's instantaneous field-of view is 150 $\mu r$ and the integration time is 0.01 seconds. Vibration levels can reach 10 pixels, peak to peak on common aircraft platforms. The resulting loss of signal to noise ratio as well as spatial information is a major problem for staring focal plane arrays.

In the majority of cases, the multiplicity of sensors required to achieve distributed aperture systems requires a greater processor load and increased complexity. Data is available from all distributed aperture scenes simultaneously for each frame. Previously, the parallel processing load has been considered unmanageable when scaled from conventional systems. For example, a distributed aperture concept can easily represent a 30-million pixel processing requirement. These pixels receive support on a parallel frame-to-frame basis. Superficially, multiple sensors appear more costly and complex as well.

Intra-sensor alignment is important for tracking and clutter discrimination. Relating data to a common inertial reference frame is also important for "pointing" targeting systems accurately. For multiple sensors sensor-to-sensor alignment is important. Sensors must be maintained in relative alignment to one another or the signals from them must be corrected to account for any misalignment which occurs.

Consequently, there is a need for an image and tracking system which can generate images from sensors subjected to motion and vibration. The sensors should either be positioned or movable to cover a wide field-of-regard. The signals from the sensors must be integrated and normalized in a relatively short time to account for overlaps in fields of view among the sensors and movement of sensors resulting from vibration or movement of the platform on which the sensors have been mounted.

SUMMARY OF THE INVENTION

We provide a plurality of sensors capable of sensing objects within a field of view about a reference sight line. At least two sensors are positioned to have different sight lines and the relative position of the sight lines of the various sensors is known. We prefer to utilize an infrared, visible or combined visible/infrared light detector in our sensor. Each sensor will produce a signal corresponding to positions of objects within a field of view of the sensor at any given time. At least one sensor signal memory is connected to the sensors which memory receives and stores the signals produced by the sensors in a manner permitting concurrent access to signals received from any selected combination of sensors. A processing unit and associated memory is provided to direct the sensors and select sensor signals from the sensor signal memory. The processing unit then either outputs selected sensor signals to a display or to a processing system which processes the signals to create a processed signal suitable for particular applications. We prefer to provide a motion detector on each of the plurality of sensors. The motion detector detects vibration and movement of each of the sensors. We also prefer to provide a means for adjusting the sensors in response to motion, flexure or vibration of the platform holding the sensors. In the present preferred sensor we provide a lens having a servo motor. The servo motor is activated in response to motion, flexure or vibration. The servo motor then adjusts the lens to compensate for the detected motion, flexure or vibration.

We also prefer to provide a internal navigation system which establishes a inertial coordinate reference system. Initially, the sight lines of the sensors are at a known relative position with respect to the inertial reference system. Whenever vibration or motion occurs to change the sight lines the navigation system provides a reference for adjusting the sensor to compensate for the motion, flexure or vibration which has occurred.

We further prefer to cluster groups of sensors. The clusters are positioned to allow a group of sensors to view through a single window.

We also prefer to provide a normalizing means for adjusting the signals received from the sensors. Normalizing means is preferably used to compensate for variations among light output among sensors. The normalizer can also compensate for signal level variations and signal gain among the sensors.

Other objects and advantages of the present invention will become apparent from a description of the certain preferred embodiments of the figures.

BRIEF DESCRIPTION OF THE FIGURES

FIG. 2 is a plan view of an image created by the embodiment of FIG. 1.

FIG. 3 is a diagram illustrating positioning of the sensors relative to the target.

FIG. 4 is a side view of a present preferred sensor which has been cut away to show major components of a present preferred sensor.

DESCRIPTION OF THE PREFERRED EMBODIMENTS

Figure 1:
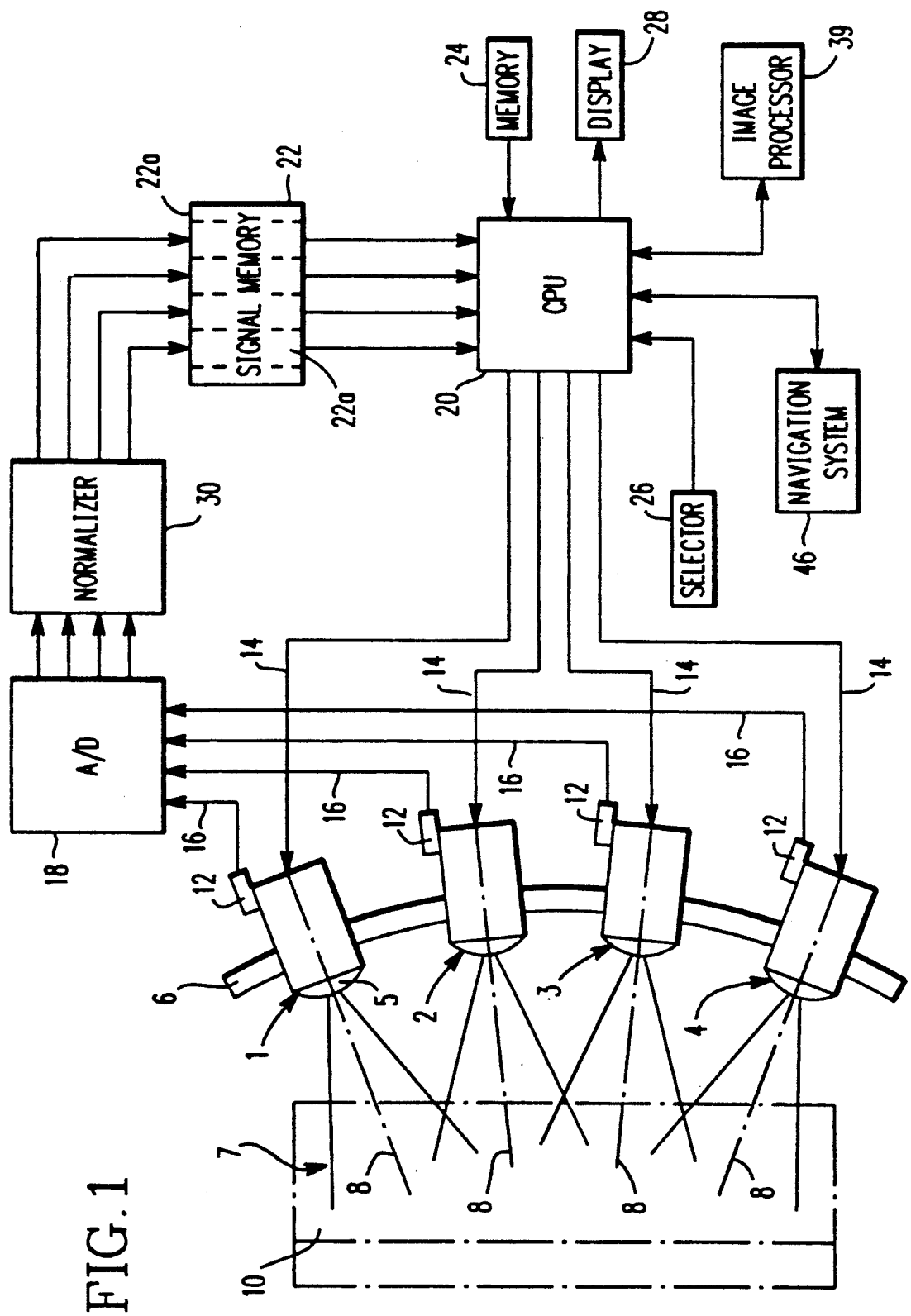
FIG. 1 is a diagram of a present preferred embodiment of our imaging tracking system.

Referring to FIG. 1 we provide a plurality of sensors 1, 2, 3 and 4 mounted on platform 6. Each of the sensors has a lens 5 which provides a field of view 7. Typically, the field of view will be about reference sight line 8 which passes through the sensor. We prefer to cluster sensors 1, 2, 3 and 4 to enable them to all have a field of view passing through common window 10. We prefer to provide a motion detector 12 on each sensor to detect the movement and vibration of the sensor over time. We provide a processing unit 20 which directs and synchronizes the sensors through lines 14. The sensors generate a signal which is output through an analog digital convertor 18. The digitized signal is directed over lines 16 into signal memory 22. Signal memory has a plurality of signal storage areas 22a indicated by the dotted lines within the signal memory. Hence, the output from each sensor is separately and concurrently accessible. Although we have illustrated four detectors inputting into the signal memory it should be understood that normally there would be a much greater number of detectors. The image signals are stored within the memory and then accessed by CPU 20. The access procedure can follow certain predetermined steps set forth in a program contained within memory 24. Alternatively, an operator could select image portions using a selector 26 connected to the CPU. This selector could be a keyboard, a mouse or a joystick controlled by a human operator. In one application we prefer the selector to be a motion sensor mounted to headgear worn by the operator. Movement of the head would be detected by the motion sensor which would send a signal to the processing unit 20 to select certain portions of the signal memory. The selected portions typically would correspond to image positions around the operator's line of sight as established by the headgear. The selected image is displayed on display 28. This display can be a CRT or LED display attached to the headgear or CRT tube or a printer.

We also prefer to configure our system to allow two or more operators to select and view images simultaneously. In that event there would be two or more selectors 26 and two or more displays 28 that share the same data in the signal memory 22.

We have found that in many sensor systems, signal outputs can vary among sensors looking at the same image. It is, therefore, necessary to normalize the signals so that any given point will produce the same signal from every sensor. Accordingly, we provide a normalizer 30 for making such corrections. Preferably the normalizer receives the signal from the sensors, enhances it and then directs the enhanced signal to signal memory 22 as shown. However, the normalizer 30 could be configured to act on signals taken from signal memory 22. The normalizer usually would have a processing unit and memory which contains a program. The program would have algorithms for modifying the digital image in accordance with a predetermined sequence. The predetermined sequence may be developed by testing the sensors either before or during sensor operation and determining variations in signal output among sensors based upon that testing. We further prefer to provide an image processor 39. The image processor is typically a programmable device containing a program for processing the digital image to produce desired information. Such digital image processors can be used for automatic scene tracking, scene correlation tracking, scene point tracking, position updates of objects within the scene, velocity updates of objects within the scene, automatic detection and identification of any scene changes, movement of the objects within the scene, emergence of new objects within the scene or detection of specific features based upon stored information. The processor may also identify detected features as, for example, airplanes or missiles. The processor may contain templates and provide template matching against objects within the image. The processor may contain digitized representations of particular features, make a comparison of objects within the image to those features and indicate when particular features are present. The image processor can also provide spatial, spectral or temporal characteristics, image correlations or any other type of image processing which the user may desire. We also prefer to provide a navigation system 46 connected to processing unit 20.

Turning to FIG. 2 we show a composite image 36 reproduced in signal memory 22. The operator normally will not see all of the images generated by all the sensors on display 28. He will only see a selected segment which could be a composite of images generated by several sensors. The composite image 36 is comprised of an image 31 from detector 1, an image 32 from detector 2, an image 33 from detector 3 and an image 34 from detector 4. The separate images overlap and are indicated by the different types of broken lines within composite image 36. For each detector image 31 thru 34 there will be a coordinate indicated by plus sign (+) 35 which preferably is at the center of each image. This coordinate is used to coarsely assemble composite images of the type shown in FIG. 2. Final precise assembly of the observer image is accomplished in the image processor 39.

In the image of FIG. 2 we show an object 40 which is detected within images 32 and 33. In our system a user has the capability of selecting an image window 44 which fits in his image display 28 and which may be comprised of overlapping several images such as 31, 32 and 33. The selected image in FIG. 2 was generated from images from sensors 1, 2 and 3. The processing unit enables the user to select window 44. Image processors can be provided to enhance the selected window in any desired manner. The window 44 is capable of being created because each of the signals which generates the segments within images 31, 32 and 33 had been separately stored within signal memory 22.

Turning to FIG. 3 the navigation system 46 generates a 3-axis reference system indicated by axes 49. We can consider a reference plane 47 to be parallel to the north and east axes in direction indicator 49. If one considers line 48 from the target to the reference plane 47, we see that line 48 is at some angle $\theta$ from a vertical line 41 passing through navigation plane 47. When sensor 1 is in alignment with the navigation system sight line 8 will be at some known relative position with respect to plane 47. In FIG. 3 sight line 8 is parallel to plane 7. Hence, a line 48 from target 50 passing through the sight line 8 will produce the same angle $\theta$ relative to a line 42 perpendicular to sight line 8 and corresponding angle $\phi$ between line 48 and sight line 8. If detector sight line 8 is moved because of vibration or movement of the platform to which the sensor is mounted, angles $\theta$ and $\phi$ will change. Since the reference plane 47 remains in the same position, it is necessary to adjust for the change in angles. Before such an adjustment can be made, however, one must determine the amount of movement of detector 1. This is accomplished through the use of motion detector 12. As shown in FIG. 4 the motion detector contains three orthogonal gyroscopes 52 and three orthogonal accelerometers 54. The motion detector 12 generates a signal which passes along line 53 to processing unit 20. We prefer also to provide a second line 55 from the motion detector to a servo motor 56 and associated processor. The servo motor 56 responds to the information received from motion detector 12 by adjusting the optical line-of-sight 8 of lens 5. This can be done by moving the support 57 on which lens 5 has been mounted. Within the detector 1 we provide a sensor array 58 which generates a signal in response to light passing from the scene through lens 5. That signal is directed along line 16 to the processing unit. The detector is mounted on platform 6. One may provide an additional servo motor 60 controlled by the processing unit through input 62. Servo motor 60 is used to make major changes in the position of the detector 1.

Figure 6:
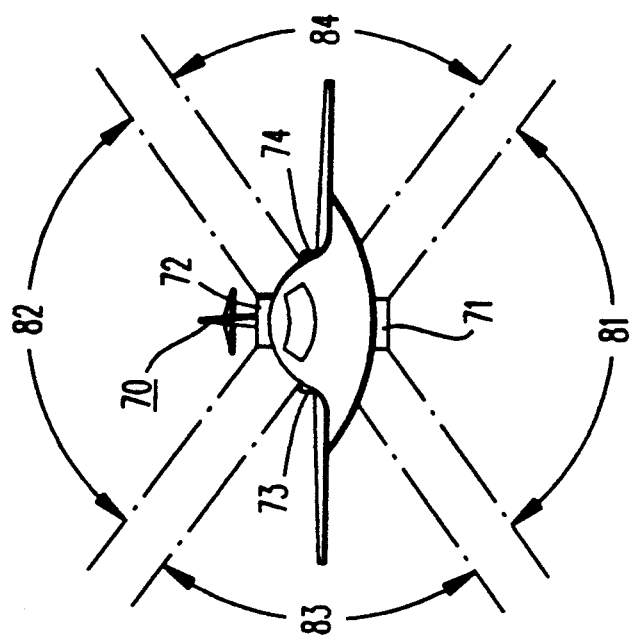
FIGS. 5 and 6 are diagrams illustrating positioning of sensors in a second preferred embodiment of our image processing system.
Figure 5:
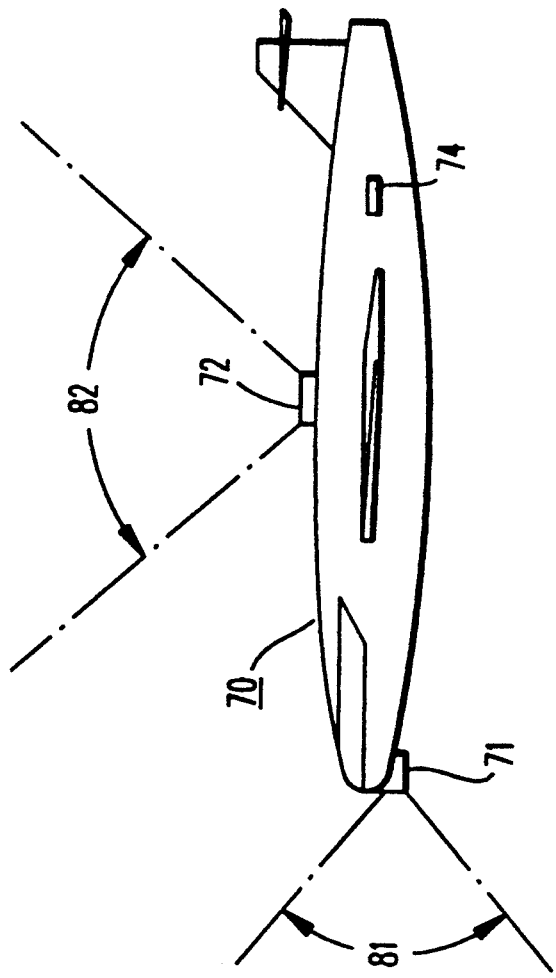

One advantage of our system is that the detectors need not be adjacent to one another, but may be positioned at several locations along a platform. In FIGS. 5 and 6 we show an airplane 70 having sensors 71, 72, 73 and 74 positioned at the nose, top, and rear of the airplane respectively. Sensors 71, 72, 73 and 74 could be individual sensors or clusters of sensors. The sensors or sensor clusters have corresponding fields of view 81, 82, 83 and 84 which together almost entirely surround the airplane. Moreover, the sensors need not protrude from the airplane, but could be placed behind windows which follow the contour of the airplane body.

Although we have shown certain present preferred embodiments of our image detection and tracking system, it should be understood that our invention is not limited thereto, but may be variously embodied within the scope of the following claims.

We claim:
1. An imaging system comprising:
a plurality of sensors capable of sensing objects within a field of view about a sight line, at least two sensors positioned to have different sight lines and the sight lines having known relative positions, each sensor producing signals corresponding to positions of objects within a field of view at a given time at least one sensor being subjected to at least one of motion, flexure and vibration;
means for sensing and measuring at least one of motion, flexure and vibration of each at least one sensor;
an internal navigational system which establishes a reference plane which reference plane remains in a selected position;
adjustment means attached to at least one sensor and to the internal navigation system so that the adjustment means will adjust the sight lines of the sensors in response to movement of the sensors caused by at least one of motion, flexure and vibration and to maintain a desired spatial relationship between the reference plane and the sight lines of the sensors;
at least one sensor signal memory connected to the sensors which receives and stores the signals produced by the sensors in a manner permitting concurrent access to and display of signals received from any selected combinations of at least two sensors; and
a processing unit and associated memory containing at least one program for selecting sensor signals from the sensor signal memory in a manner to create a composite image from signals from at least two sensors and doing at lease one of outputting selected sensor signals, processing selected sensor signals to create at least one processed signal and outputting selected processed signals, the processing unit being connected to at least one sensor signal memory.

2. The imaging system of claim 1 where the means for sensing and measuring comprises one of a gyroscope and an accelerometer.

3. The imaging system of claim 1 also comprising a lens having a line of sight and attached to a selected sensor and the adjustment means and wherein the adjustment means comprises a motor for moving the lens line of sight.

4. The imaging system of claim 1 wherein at least two the sensors are clustered so that their sight lines intersect.

5. The imaging system of claim 4 wherein a plurality of sensors are positioned around a window so that the lines of sight of all sensors so positioned pass through the window.

6. The imaging system of claim 1 wherein the sensors are capable of sensing at least one of visible light, infrared light and radar signals.

7. The imaging system of claim 1 also comprising normalizing means connected to the sensors for normalizing signals received from the sensors.

8. The imaging system of claim 7 wherein the normalizing means comprises a processing unit and associated memory containing a program for modifying the signals in a desired manner.

9. The imaging means of claim 7 wherein the normalizing means adjusts the signals to normalize for one of signal gain and variation in intensity among sensors and sensor elements.

10. The imaging system of claim 1 also comprising a display connected to the processing unit.

11. The imaging system of claim 10 wherein the display is one of a cathode ray tube and an LED for displaying video images corresponding to selected signals.

12. The imaging system of claim 10 also comprising a selector connected to the processing unit, the selector enabling a user to select desired signals from the sensor signal memory to cause images corresponding to the selected signals to appear on the display.

13. The imaging system of claim 12 wherein the selector is a motion sensor attached to headgear and connected to the processing unit so that signals and corresponding video images will be selected in response to movement of the headgear.

14. The imaging system of claim 1 also comprising a plurality of of displays and a plurality of selectors to enable more than one operator to separately access an image when an image selected by one operator is different from an image selected by another operator.

15. The imaging system of claim 14 wherein more than one operator can access images simultaneously.

* * * * *